(12) United States Patent
Sun et al.

(10) Patent No.: US 10,991,085 B2
(45) Date of Patent: Apr. 27, 2021

(54) CLASSIFYING PANORAMIC IMAGES

(71) Applicant: ADOBE INC., San Jose, CA (US)

(72) Inventors: Qi Sun, Santa Clara, CA (US); Li-Yi Wei, Redwood City, CA (US); Joon-Young Lee, Milpitas, CA (US); Jonathan Eisenmann, San Francisco, CA (US); Jinwoong Jung, Pohang (KR); Byungmoon Kim, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 53 days.

(21) Appl. No.: 16/372,202

(22) Filed: Apr. 1, 2019

(65) Prior Publication Data
US 2020/0311901 A1    Oct. 1, 2020

(51) Int. Cl.
*G06K 9/62* (2006.01)
*G06T 7/00* (2017.01)
*G06N 3/04* (2006.01)

(52) U.S. Cl.
CPC .......... *G06T 7/0002* (2013.01); *G06K 9/6267* (2013.01); *G06N 3/0481* (2013.01); *G06T 2207/20084* (2013.01); *G06T 2207/20208* (2013.01)

(58) Field of Classification Search
CPC ......... G06T 7/0002; G06T 2207/20208; G06T 2207/20084; G06N 3/0481; G06K 9/6267
See application file for complete search history.

(56) References Cited

U.S. PATENT DOCUMENTS

| | | | |
|---|---|---|---|
| 10,027,888 B1* | 7/2018 | Mackraz | H04N 13/383 |
| 10,230,866 B1* | 3/2019 | Townsend | H04N 1/2108 |
| 2019/0164312 A1* | 5/2019 | Sunkavalli | G06N 3/0454 |
| 2019/0289341 A1* | 9/2019 | Vasco de Oliveira Redol | H04N 21/23424 |

OTHER PUBLICATIONS

Editing 360 photos & injecting metadata, Mar. 22, 2019. (Year: 2019).*

(Continued)

*Primary Examiner* — Phuoc Tran
(74) *Attorney, Agent, or Firm* — Shook, Hardy & Bacon L.L.P.

(57) ABSTRACT

Embodiments herein describe a framework for classifying images. In some embodiments, it is determined whether an image includes synthetic image content. If it does, characteristics of the image are analyzed to determine if the image includes characteristics particular to panoramic images (e.g., possess a threshold equivalency of pixel values among the top and/or bottom boundaries of the image, or a difference between summed pixel values of the pixels comprising the right vertical boundary of the image and summed pixel values of the pixels comprising the left vertical boundary of the image being less than or equal to a threshold value). If the image includes characteristics particular to panoramic images, the image is classified as a synthetic panoramic image. If the image is determined to not include synthetic image content, a neural network is applied to the image and the image is classified as one of non-synthetic panoramic or non-synthetic non-panoramic.

16 Claims, 10 Drawing Sheets

(56) References Cited

OTHER PUBLICATIONS

Editing 360 photos & injecting metadata, Mar. 22, 2019. https://facebook360.fb.com/editing-360-photos-injecting-metadata/.
Editingupload 360-degree videos. https://support.google.com/youtube/answer/6178631, Mar. 22, 2019.
Vladimir Bychkovsky, Sylvain Paris, Eric Chan, and Fredo Durand. Learning photographic global tonal adjustment with a database of input/output image pairs. In Computer Vision and Pattern Recognition (CVPR), 2011 IEEE Conference on, pp. 97-104. IEEE, 2011.
Naila Murray, Luca Marchesotti, and Florent Perronnin. Ava: A large-scale database for aesthetic visual analysis. In Computer Vision and Pattern Recognition (CVPR), 2012 IEEE Conference on, pp. 2408-2415. IEEE, 2012.
Jianxiong Xiao, Krista A Ehinger, Aude Oliva, and Antonio Torralba. Recognizing scene viewpoint using panoramic place representation. In Computer Vision and Pattern Recognition (CVPR), 2012 IEEE Conference on, pp. 2695-2702. IEEE, 2012.

\* cited by examiner

CLASSIFYING PANORAMIC IMAGES

BACKGROUND

Panoramic images include horizontally-elongated fields-of-view relative to standard images. Generally, images are considered to be panoramic if they have an aspect ratio of at least 2:1, that is, if they are at least twice as wide (horizontal measurement) and they are high (vertical measurement). Capturing panoramic images has become increasingly popular as off-the-shelf cameras having panoramic image capturing capabilities have become widely available. When panoramic images are stored in an image array (e.g., a digital photo album), such images often are mixed with narrow field-of-view images (i.e., images having less than a 2:1 aspect ratio). For instance, many image-capturing devices include limited image storage locations and/or formats. Thus, all images, irrespective of whether they are panoramic images or not, are organized and stored in a single image-capture location and/or format. Because managing panoramic images often necessitates additional and or different functions than managing non-panoramic images, differentiating between panoramic images and non-panoramic images can be useful for digital image asset manipulation and/or management applications such as, by way of example only, Adobe Photoshop®.

Current digital image asset manipulation and/or management applications often rely on metadata associated with acquired images to identify which images in an image array are panoramic images. However, such identification techniques often are inadequate as some image management/editing tools may discard image metadata or fail to recognize image metadata having a format that is non-standard (for instance, metadata that is manually input by a user).

SUMMARY

Embodiments of the present disclosure relate to, among other things, a framework for automatically classifying images. Image classifications may be beneficial, for instance, in facilitating classification-based image searching and/or facilitating accurate ranking of image-containing webpages. In some instances, images that contain synthetic content and images that do not contain synthetic content may be classified using different methodologies. For instance, when utilizing a trained neural network to classify images, the accuracy and consistency of the neural network is dependent, in part, on the training images utilized to train the network. Thus, if the network is trained utilizing only natural camera-captured images, it may not be accurate for images containing synthetic content, rendering a different classification method for images containing synthetic content desirable.

Thus, upon acquiring or receiving an image, embodiments of the present disclosure determine whether or not the image includes synthetic image content. "Synthetic image content," as the term is utilized herein, is man-made, digitally created content. Synthetic image content may be created, for instance, utilizing computer graphics technology. Images that are not determined to include synthetic image content are presumed to contain only natural, camera-captured content. Determining whether or not an image includes synthetic image content may be achieved, for instance, by determining whether there is a high dynamic range of pixel values among pixels comprising the image, such high dynamic range being indicative of synthetic image content. A high dynamic range of pixel values may be range of pixel values that is greater than or equal to 16 bits per color channel.

In addition to, or as an alternative to, a determination of whether or not an image includes synthetic content, in some instances, it may be desirable to differentiate between panoramic images and non-panoramic images. Classifying an image as panoramic or non-panoramic may be desirable, at least in part, due to image characteristics that are particular (e.g., unique) to images that include fields-of-view that result in images that are outside of standard image aspect ratios. As such, to accurately and consistently classify images, embodiments of the present invention analyze various characteristics of images to determine if the image includes at least one characteristic that is particular to panoramic images. That is, various characteristics may be analyzed to determine if the image includes at least one characteristic that generally is not possessed by non-panoramic images. In some aspects, a characteristic that is particular to panoramic images may include greater than or equal to a threshold equality of pixel values among at least one of the pixels comprising the top boundary of the image or the pixels comprising the bottom boundary of the image. An exemplary threshold may be 90% equality. In some aspects, a characteristic that is particular to panoramic images may include a difference between the summed pixel values of the pixels comprising the right boundary of the image and the summed pixel values of the pixels comprising the left boundary of the image of less than or equal to a threshold value. An exemplary threshold value may be at least 5.0.

If an image is determined to include at least one characteristic that is particular to panoramic images, embodiments of the present disclosure classify the image as a panoramic image. If an image fails to include at least one characteristic that is particular to panoramic images, embodiments of the present disclosure classify the image as a non-panoramic image. In some aspects, the image may be annotated with the classification to, e.g., facilitate classification-based image searching and/or to enhance search rankings for webpages that include images. In some aspects, the image classification additionally may include a synthetic or non-synthetic designation, as appropriate. In some aspects, a determination of an image as containing or not containing synthetic content may be utilized not in the classification itself but to determine the methodology used to classify the image as panoramic or non-panoramic. Any and all such variations, and any combination thereof, may be utilized with the scope of embodiments of the present disclosure.

In some embodiments of the present disclosure, a trained neural network is applied to an image and based, at least in part, on application of the neural network, the image classified as one of a panoramic image and a non-panoramic image. In some aspects, the image may be annotated with the classification to, e.g., facilitate classification-based image searching and/or to boost search rankings for webpages including images, or the like. In some aspects, the image classification additionally may include a synthetic or non-synthetic designation, as appropriate. In some aspects, a determination of an image as containing or not containing synthetic content may be utilized not in the classification itself but to determine the methodology used to classify the image as panoramic or non-panoramic. Any and all such variations, and any combination thereof, may be utilized with the scope of embodiments of the present disclosure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present disclosure relate to a framework for determining whether images are panoramic or non-panoramic and classifying the images accordingly. "Panoramic images," as described herein, are images having a horizontal field-of-view that is significantly elongated relative to the vertical field-of-view. Generally, images may be considered to be panoramic if they have an aspect ratio of at least 2:1. In other words, images may be considered panoramic if they are at least twice as wide (as evidenced by their horizontal measurement in number of pixels) as they are high (as evidenced by their vertical measurement in number of pixels). By way of contrast, non-panoramic or standard images generally have aspect ratios of 4:3 or 3:2. Some panoramic images can have aspect ratios of 10:1 or greater, for instance, panoramic images having a 360° field-of-view.

Digital image asset manipulation and management applications (such as, by way of example only, Adobe Photoshop®) often apply different and/or additional functions to panoramic images than to non-panoramic images. Accordingly, it is useful for such applications to be able to ascertain whether or not a received, acquired, or stored image is a panoramic image. However, when panoramic images are stored in an image array (e.g., a digital photo album on a smart phone device, or the like), such images often are mixed with non-panoramic images. For instance, many image-capturing devices include limited image storage locations and/or formats. Thus, all images, irrespective of whether they are panoramic images or not, are organized and stored in a single image-capture location and/or format. Accordingly, current digital image asset manipulation and/or management applications often rely on metadata, usually embedded in an image container (e.g., JPEG), to identify which images in an image array are panoramic images. However, for various reasons, there exists a large volume of panoramic images that do not include proper metadata for use in detection and classification. For instance, an image-capture device (e.g., a camera) may not associate metadata with images based upon user request. Additionally, images may be created manually and, accordingly, include metadata only if manually associated by a user. Further, metadata often is stripped from images by image editing or sharing applications.

Embodiments of the present disclosure address the challenges of detecting and classifying images as panoramic or non-panoramic by providing a framework for analyzing characteristics of the content of synthetic images to determine the presence or absence of content characteristics that are particular to panoramic images. Classifying images as panoramic or non-panoramic may facilitate classification-based image searching. Classifying images as panoramic or non-panoramic further may facilitate more accurate and/or increased search rankings for webpages that include images by providing additional data based upon which a webpage may be ranked. An exemplary characteristic particular to panoramic images may be a threshold equality of pixel values among at least one of the pixels comprising a top boundary of an image or the pixels comprising a bottom boundary of an image. An exemplary threshold may be 90% equality of pixel values. Another exemplary characteristic particular to panoramic images may be a difference between the summed pixel values of the pixels comprising the right boundary of the image and the summed pixel values of the pixels comprising the left boundary of the image of less than or equal to a threshold value. An exemplary threshold value may be at least 5.0.

Embodiments of the present invention further address the challenges of detecting and classifying non-synthetic images as panoramic or non-panoramic by providing a framework for applying a trained neural network to non-synthetic images to automatically classify such images panoramic or non-panoramic. As with synthetic images, classifying non-synthetic images as panoramic or non-panoramic may facilitate classification-based image searching and/or facilitate more accurate and/or increased search rankings for webpages that include images by providing additional data based upon which a webpage may be ranked.

Figure 1:
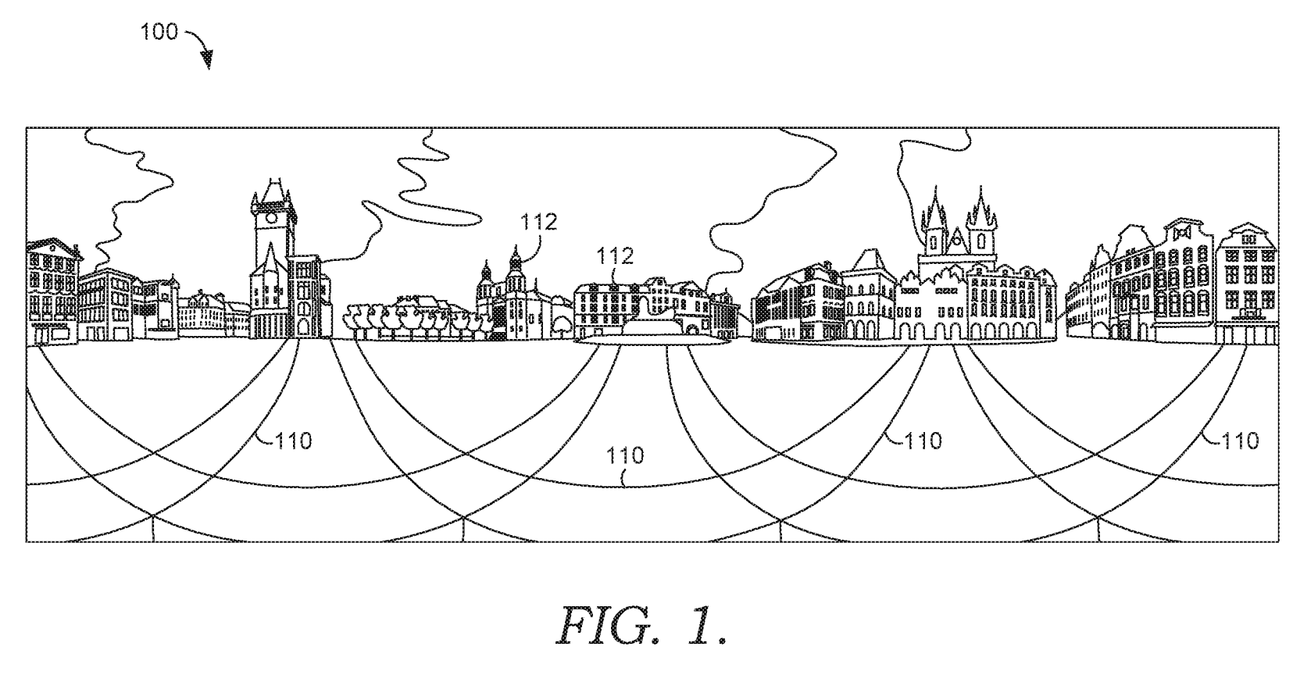
FIG. 1 is a schematic diagram illustrating a panoramic image having a geometric transformation (e.g., an equirectangular projection) applied thereto to create a transformed image having a rectangular boundary and a plurality of visible distortions.

To make panoramic images compatible with non-panoramic images, for instance, in image arrays (e.g., digital photo albums), such images often are stored in a rectangular grid after application of a geometric transformation. One common geometric transformation utilized for panoramic images having a large field-of-view (for instance, a 360° field-of-view) is an equi-rectangular projection which transforms images having spherical coordinates into polar coordinates, permitting a large field-of-view image to be viewed as a rectangular image having an aspect ratio of at least 2:1. Applying such geometric transformations, however, often results in visible distortions in the transformed image. With reference to FIG. 1, a schematic diagram is illustrated showing a 360° field-of-view panoramic image having a geometric transformation (e.g., an equi-rectangular projection) applied thereto. As can be seen, the resultant transformed image includes a rectangular boundary, as desired, but also includes a plurality of visible distortions 110, 112. The visible distortions 110 show distortion of a sidewalk or road and illustrate how such distortions can make substantially straight lines appear curved. The visible distortions 112 show distortion of adjacent buildings and illustrate how such distortions can make the buildings appear as though they face different directions when, in fact, the buildings are aligned along the same sidewalk or road.

Figure 2:
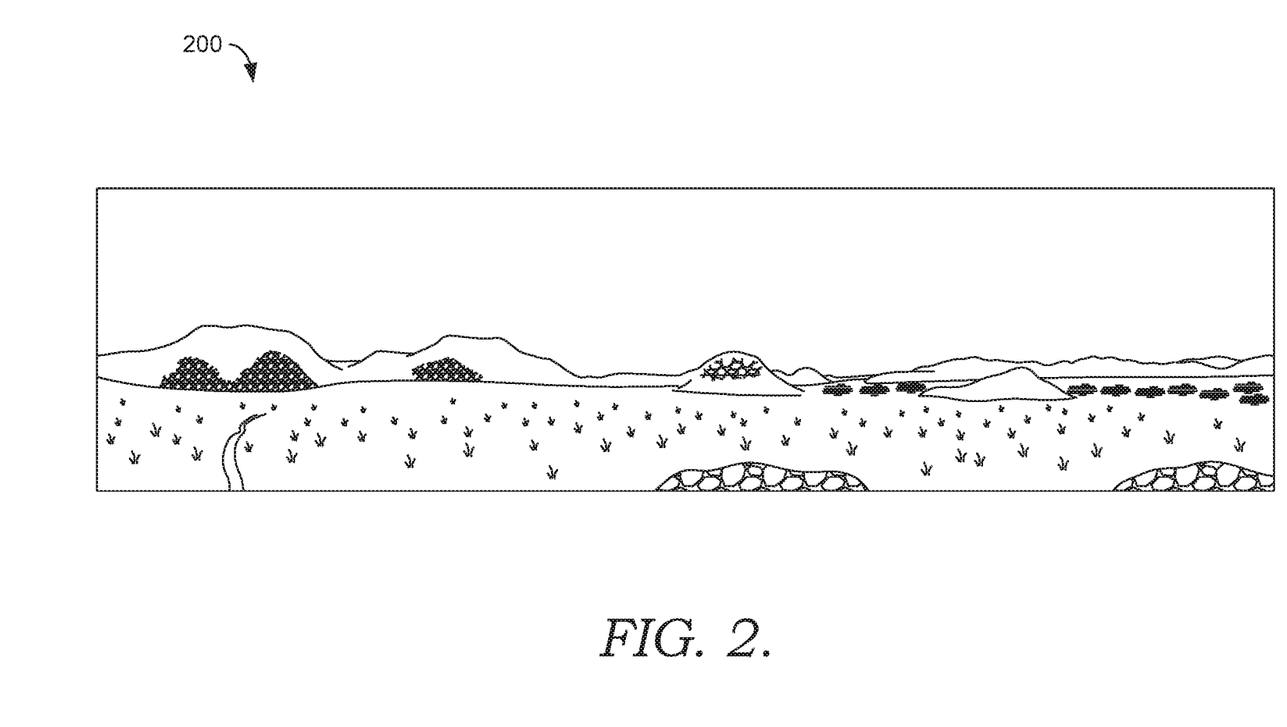
FIG. 2 is a schematic diagram illustrating a wide-angle image that is not a panoramic image and, accordingly, does not contain visible distortions that are characteristic of geometrically transformed panoramic images.

Visible distortions such as those shown in FIG. 1 are relatively simple for the human eye to detect and thus, it is relatively simple for the human eye to differentiate panoramic images from non-panoramic images. However, such detection is not as straight-forward when automated detection methods are applied. As also can be seen in FIG. 1, the boundary of a panoramic image is elongated in the horizontal direction relative to the corresponding vertical direction. While at first glance this characteristic may appear promising for differentiating panoramic images from non-panoramic images, this characteristic alone is insufficient for automated detection methods as wide-angle images that are not panoramic can have a similar size and shape. Such a wide-angle image 200 that is not a panoramic image is illustrated in the schematic diagram of FIG. 2. As can be seen, though having a similar size and shape as the image 100 of FIG. 1, the image 200 does not contain visible distortions that are characteristic of geometrically transformed panoramic images. However, reliance by an automated detection method on the size and shape of the image would not result in recognition of this nuance.

Embodiments of the present disclosure address these challenges in recognizing panoramic images by providing a framework for analyzing characteristics of the content of images to determine the presence or absence of characteristics that are particular to panoramic images. The framework further provides for applying a trained neural network to images to determine whether the images are panoramic images or non-panoramic images. Whether content characteristics are analyzed or a trained neural network is applied depends upon an initial determination of the content of a received image as including synthetic (man-made) content or not including synthetic image content (and thus presumably including only camera-captured content), as more fully described below.

Figure 3:
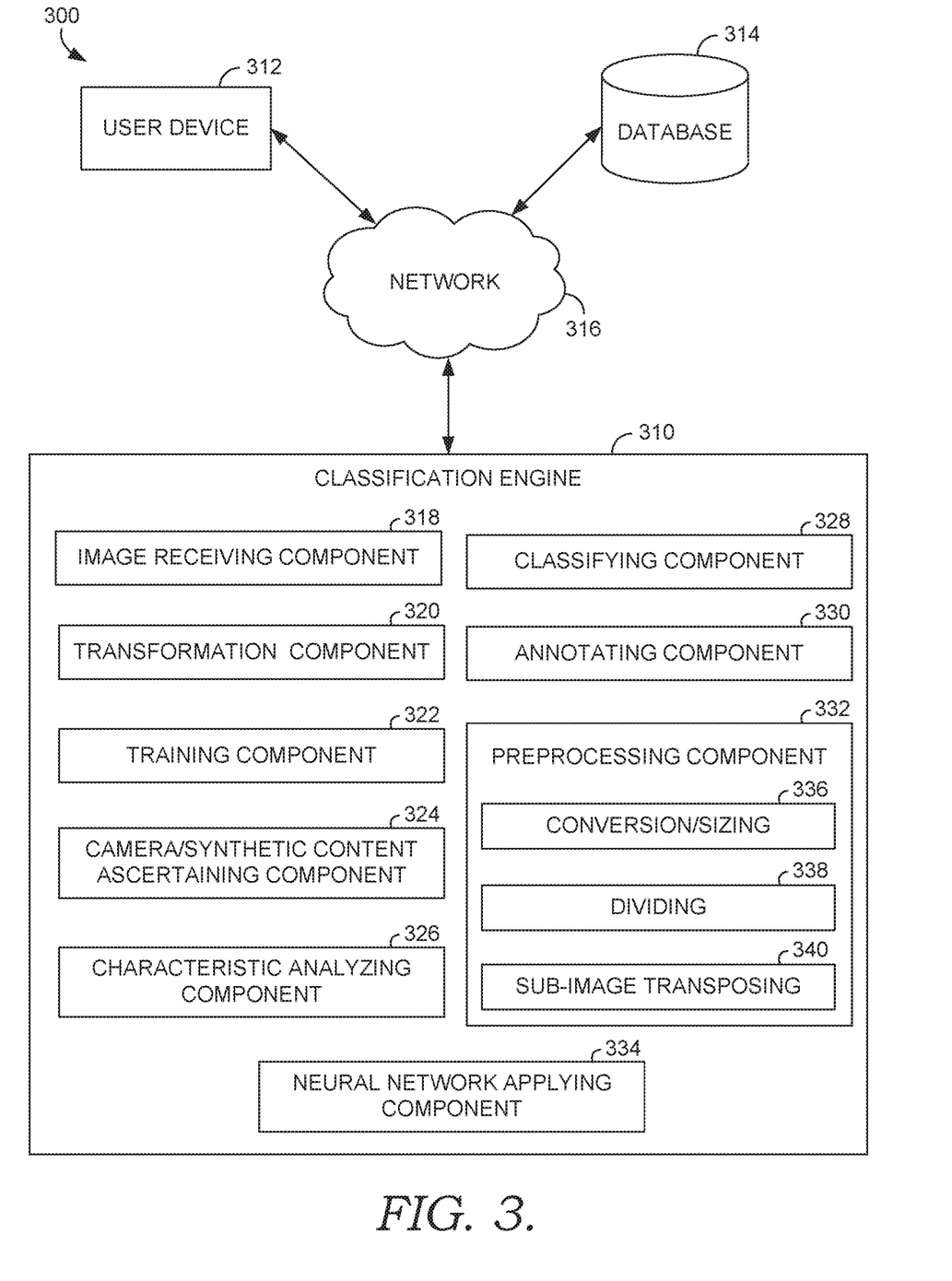
FIG. 3 is a block diagram illustrating an exemplary system for classifying panoramic images, in accordance with implementations of the present disclosure.

With reference now to FIG. 3, a block diagram is shown illustrating an exemplary system 300 for classifying images in accordance with embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 300 is an example of a suitable architecture for implementing certain aspects of the present disclosure. Among other components not shown, the system 300 includes an image classification engine 310 interacting with a user device 312 (e.g., a user computing device or an image capturing device) and a database 314 to facilitate classification of images, for instance, as panoramic images or non-panoramic images. Each of the components shown in FIG. 3 can be provided on one or more computing devices, such as the computing device 1000 of FIG. 10, discussed below. As shown in FIG. 3, the image classification engine 310, the user device 312 and the database 314 may be accessed and/or can communicate with one another via a network 316, which may include, without limitation, one or more local area networks (LANs) and/or wide area networks (WANs). Such networking environments are commonplace in offices, enterprise-wide computer networks, intranets, and the Internet. It should be understood that any number of user devices and image classification engines may be employed within the system 300 within the scope of the present disclosure. Each may comprise a single device or multiple devices cooperating in a distributed environment. For instance, the image classification engine 310 could be provided by multiple server devices collectively providing the functionality of the image classification engine 310 as described herein. Additionally, other components not shown also may be included within the network environment.

The image classification engine 310 generally is configured to facilitate detection of a received image as a panoramic image (i.e., an image having a sizeable field-of-view, for instance, a 360° field-of-view) or a non-panoramic image and classification of a received image as having panoramic or non-panoramic. The user device 312 can access and communicate with the image classification engine 310 via a web browser or other application running on the user device 312. Alternatively, the image classification engine 310 may be installed on the user device 312 such that access via the network 316 is not required.

The image classification engine 310 includes an image receiving component 318, an image transformation component 320, a training component 322, a camera-captured/synthetic image content ascertaining component 324, an image characteristic analyzing component 326, an image classifying component 328, an image annotating component 330, an image preprocessing component 332, and a neural network training component 334. The image receiving component 318 is configured to receive one or more images, for instances, one or more images captured by and/or downloaded to the user device 312. Received images may include panoramic images (e.g., images having a 360° field-of-view; images spanning 360° around a reference point) or non-panoramic images. In embodiments, received images may be images transformed into a rectangular image (for instance, by the image transformation component 320, more fully described below). Received images further may include a collection of pixels, each pixel of the collection having a pixel value. Still further, received images may include a top horizontal boundary, a bottom horizontal boundary, a right vertical boundary, and a left vertical boundary. Each of the top, bottom, right and left boundaries may include a respective plurality of pixels, each pixel having a pixel value. The pixels comprising each plurality of pixels also may be included in the collection of pixels comprising the received image.

The image transformation component 320 is configured for applying a geometric transformation (for instance, an equi-rectangular projection) to panoramic image to transform the image into an image having a rectangular boundary such that it is capable of, among other things, being uniformly organized with non-panoramic images. Though the image classification engine 410 is illustrated as including the image transformation component 320, it is within the scope of embodiments of the present disclosure for panoramic images to be transformed into images having a rectangular boundary prior to receipt by the image receiving component 318. Thus, the image classification engine 410, in embodiments, may be void of the transformation component 320.

Figure 5:
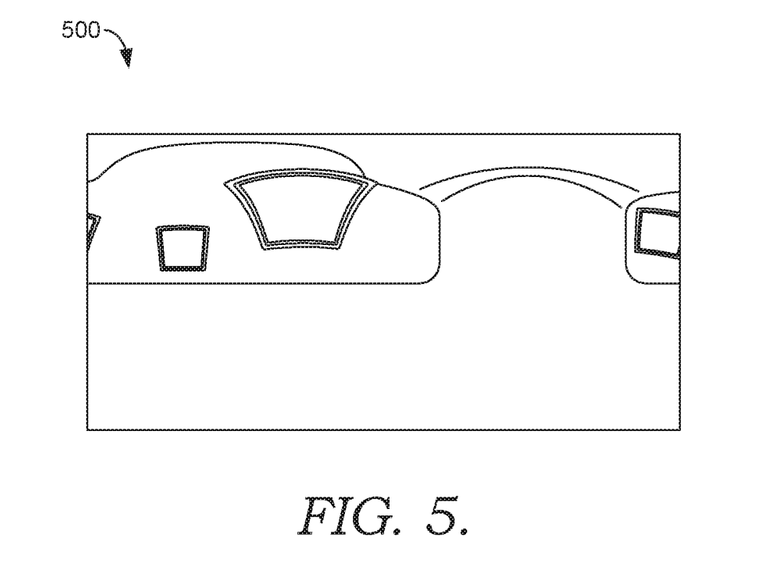
FIG. 5 is a schematic diagram illustrating an image having synthetic image content and void of natural, camera-captured content.

The camera-captured/synthetic image content ascertaining component 324 is configured to ascertain whether a received image includes synthetic image content. "Synthetic image content," as the term is utilized herein, is content that is man-made or created. In other words, synthetic image content refers to content that is not captured by a camera or other image-capture device. With reference to FIG. 5, illustrated is a schematic diagram showing an image 500 having synthetic (man-made, digitally-created) content and void of camera-captured content. Synthetic image content generally has a high dynamic range of pixel values (for instance, 16 bits per color channel) that make up the content relative to camera-captured content, which generally includes a low dynamic range of pixel values, for instance, 8-14 bits per color channel. Accordingly, in embodiments, to ascertain whether a received image includes synthetic image content, the camera-captured/synthetic image content ascertaining component 324 is configured to determine whether or not the pixel values of the collection of pixels comprising an image include a high dynamic range (greater than or equal to 16 bits per color channel) or a low dynamic range (less than 16 bits per color channel). In embodiments, images having a collection of pixels that include a high dynamic range may be classified as having synthetic image content and images having a collection of pixels that include a low dynamic range may be classified as not having synthetic image content. Images that are determined to include synthetic image content may be analyzed (e.g., by the image characteristic analyzing component 326, more fully described below) to determine, based on the content thereof, whether or not the image is a panoramic image. Images that are determined to not include synthetic image content may be input into a neural network (e.g., by the neural network applying component 334, more fully described below) to determine, based upon automated comparison to images labeled as panoramic or non-panoramic, whether or not the image is a panoramic image.

Figure 6:
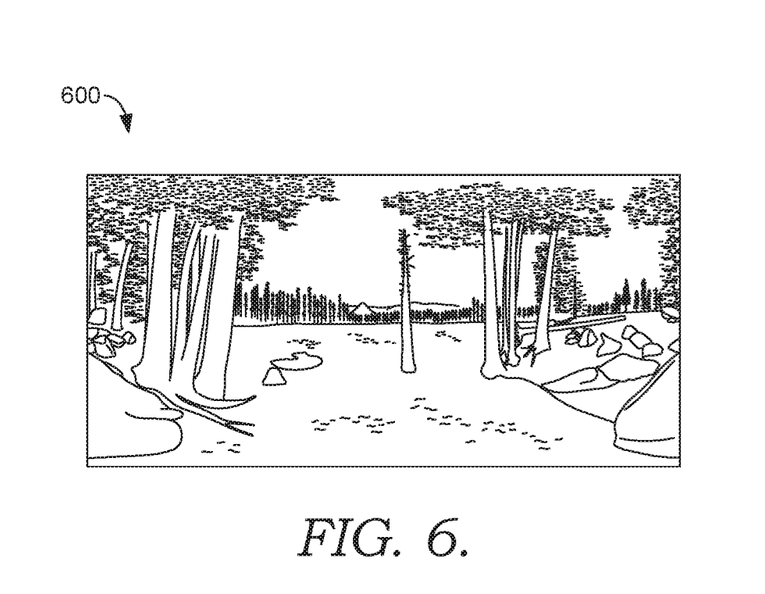
FIG. 6 is a schematic diagram illustrating an image having natural, camera-captured content and void of synthetic image content.

"Camera content" or "camera-captured content," as the terms are utilized herein, refer to content that is captured by a camera or other image-capturing device. With reference to FIG. 6, illustrated is a schematic diagram illustrating an image 600 having camera-captured content and being void of synthetic content. In embodiments hereof, if an image is ascertained (e.g., by the camera-captured/synthetic image content ascertaining component 324) to include synthetic image content, the image is considered a synthetic image for further processing.

Subsequent to application of a geometric transformation (e.g., an equi-rectangular projection), panoramic images generally include one or more characteristics that are specific to such images. For instance, the pixels comprising at least one of the top horizontal boundary and the bottom horizontal boundary of the rectangular transformed image come from the same location in the original panoramic image. As such, one characteristic of panoramic images is that the pixels of the top horizontal boundary or the bottom horizontal boundary of the rectangular transformed image generally have the same or similar pixel values (e.g., pixel values that are the same or within ten numerical values). Another characteristic particular to panoramic images is that a difference between the summed pixel values of the pixels comprising the right boundary of the image and the summed pixel values of the pixels comprising the left boundary of the image is less than or equal to a threshold value. In aspects, the threshold value may be 5.0. Summed pixel values on opposing boundaries of an image are considered highly correlated for purposes of present disclosure if they are within a threshold value.

In view of such characteristics that are specific to panoramic images, the image characteristic analyzing component 326 is configured to analyze one or more characteristics of content comprising a received image to determine whether the image includes at least one characteristic that is particular to panoramic images. As such, the image characteristic analyzing component 326 is configured to determine whether or not the pixels comprising at least one of the top horizontal boundary and the bottom horizontal boundary of the rectangular transformed image have an equivalent pixel value. In aspects, equivalent pixel values are pixel values that are the same or similar to one another. By way of example only, similar pixel values may include pixel values that are within ten or fewer numerical values of one another (e.g., a pixel value of 155 and a pixel value of 163 may be equivalent pixel values). In aspects, the image characteristic analyzing component 326 is configured to determine whether or not the pixel values of greater than or equal to a threshold quantity of the pixels comprising the top horizontal boundary or the bottom horizontal boundary of the rectangular transformed image include an equivalent pixel value. In aspects, the threshold quantity may include quantities that are at least 90% equivalent.

The image characteristic analyzing component 326 further is configured to determine whether or not the pixels comprising the right vertical boundary of an image are highly correlated with pixels comprising the left vertical boundary of the image. In aspects, the image characteristic analyzing component 326 is configured to determine whether or not the pixels comprising the right and left vertical boundaries of an image are highly correlated by determining a difference between the summed pixel values of the pixels comprising the right boundary of the image and the summed pixel values of the pixels comprising the left boundary of the image is less than or equal to a threshold value. In embodiments, a suitable threshold value may be 5.0.

The image classifying component 328 is configured to classify an image as a panoramic image or a non-panoramic image based, at least in part, on a determination (e.g., by the image characteristic analyzing component 326) that the received image includes at least one characteristic particular to panoramic images.

Figure 4A:
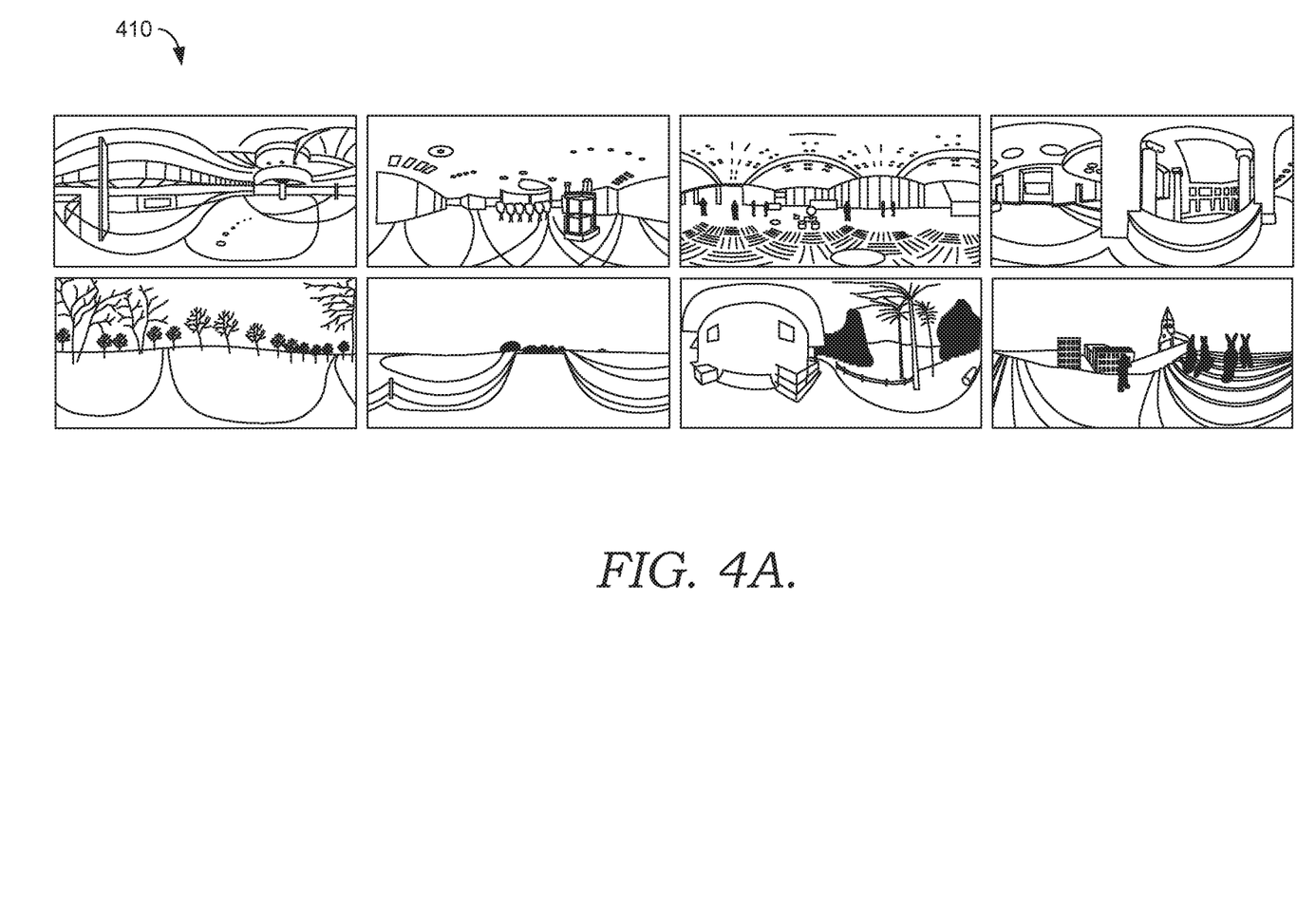
FIG. 4A is a schematic diagram illustrating a plurality of natural, camera-captured geometrically-transformed panoramic images, each image having at least one visible distortion.
Figure 4B:
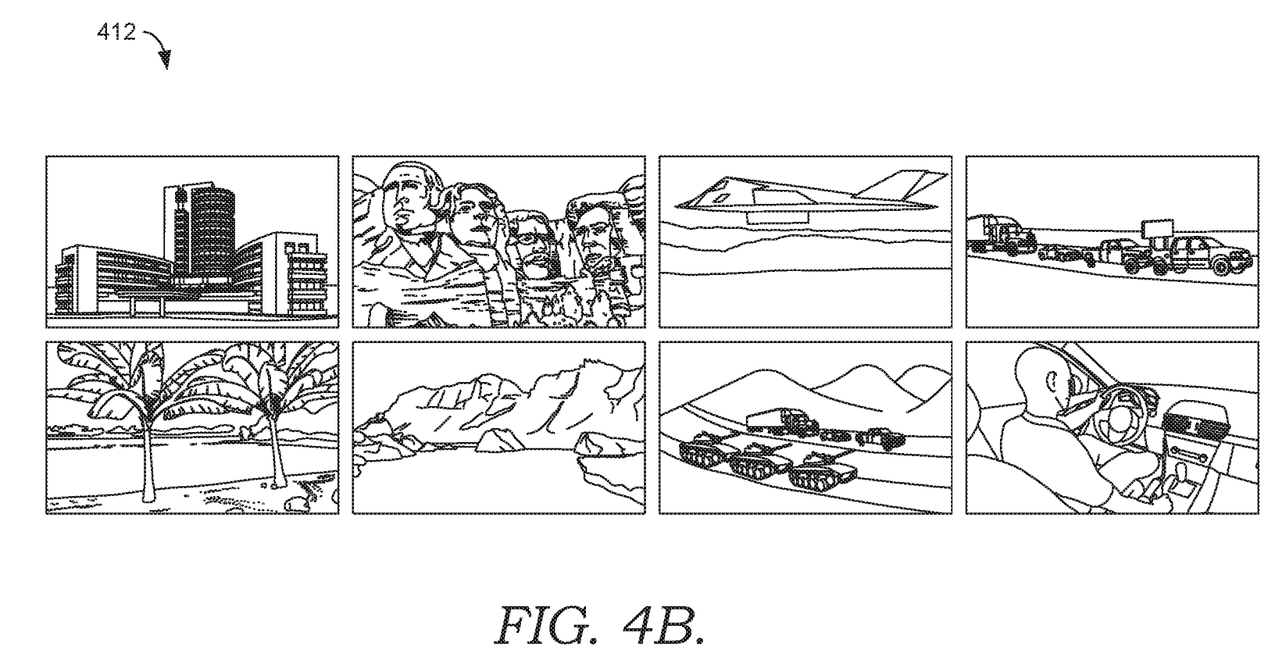
FIG. 4B is a schematic diagram illustrating a plurality images that are natural, camera-captured non-panoramic images and are void of visible distortions.

As previously set forth, images that are determined to not include synthetic image content may be input into a neural network to determine, based upon automated comparison to images labeled as panoramic or non-panoramic, whether or not the image is panoramic image. In this regard, the neural network training component 334 is configured to train a neural network with a supervised learning approach utilizing labeled data. With reference to FIG. 4A, illustrated is a plurality 410 of positive training images (i.e., panoramic images) that may be utilized to train a neural network (e.g., the neural network 700 of FIG. 7, more fully described below). With reference to FIG. 4B, illustrated is a plurality 412 of negative training images (i.e., non-panoramic images) that may be utilized to train a neural network (e.g., the neural network 700 of FIG. 7, more fully described below). Supervised training of neural networks is known to those having ordinary skill in the art and, accordingly, is not further described herein.

Figure 7:
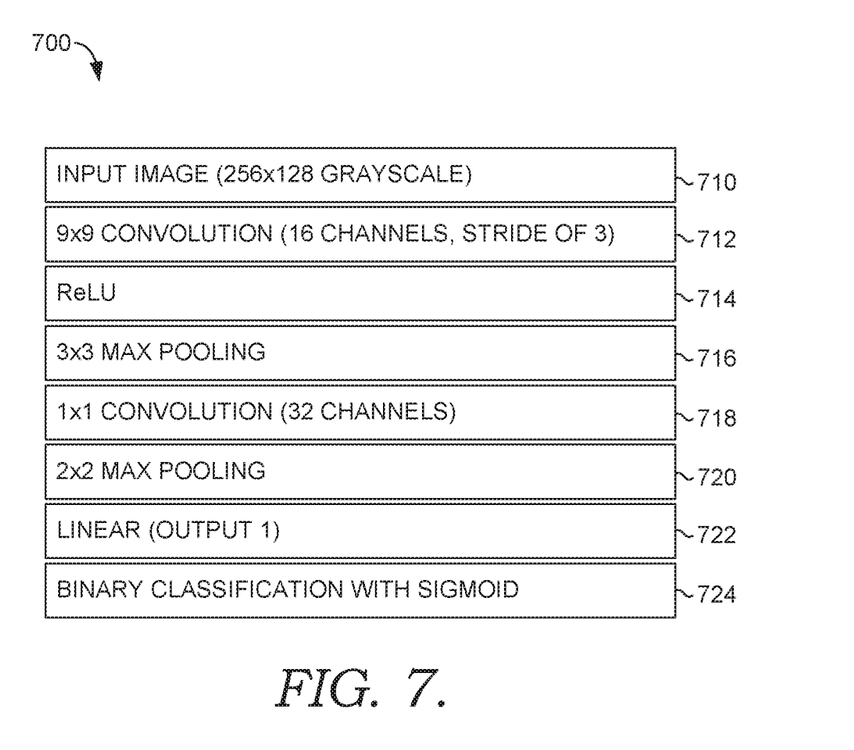
FIG. 7 is a schematic diagram illustrating a neural network that may be applied to classify images that are void of synthetic image content as non-synthetic panoramic images or non-synthetic non-panoramic images, in accordance with implementations of the present disclosure.

The neural network applying component 334 is configured to apply a neural network trained utilizing images labeled as panoramic or not panoramic to determine whether an image that does not include synthetic image content is a panoramic image. A schematic diagram of an exemplary neural network 700 suitable for use in implementations of the present disclosure is illustrated in FIG. 7. The exemplary neural network 700 includes an input layer 710, a plurality of hidden layers 712, 714, 716, 718, and 720 and an output layer 724. The plurality of hidden layers includes a 9×9 convolution layer 712 having 16 channels and a stride of 3, a ReLU layer 714, a 3×3 max pooling layer 716, a 1×1 convolution layer (32 channels) 718, and a 2×2 max pooling layer 720. The exemplary neural network 700 further includes a binary classification layer 724 for classifying an input image as panoramic or non-panoramic.

The image annotating component 330 is configured, based upon the classifications determined by the classifying component 328, to annotate (e.g., inject into the metadata of) a received image with the classification of the image as panoramic or non-panoramic. Having images annotated with such classifications may, in some instances, facilitate image manipulation, management and/or editing applications to appropriately process images.

Figure 8A:
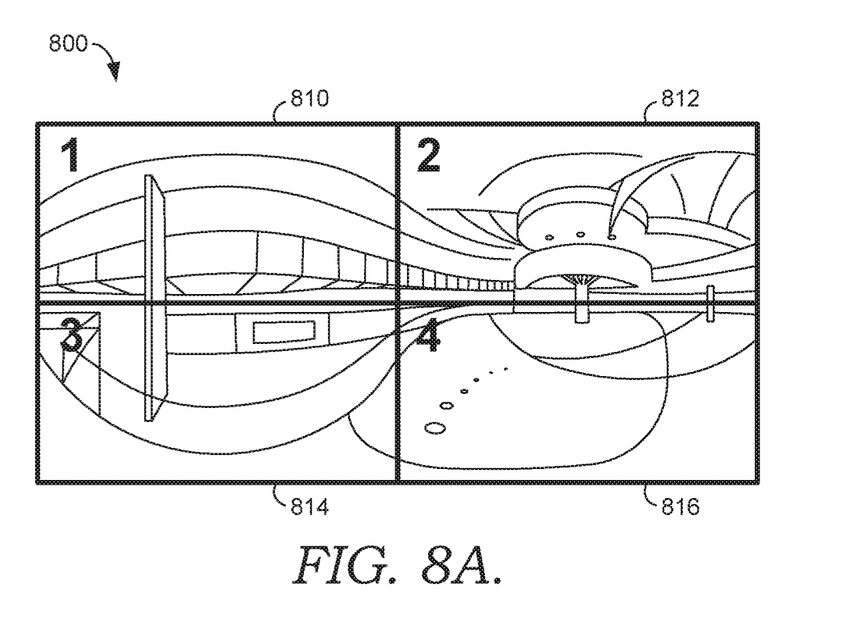
FIG. 8A is a schematic diagram illustrating a geometrically-transformed panoramic image divided into four sub-images, in accordance with implementations of the present disclosure.

In some instances, applying one or more preprocessing steps to received images prior to application of a neural network may be beneficial, for instance, for facilitating the neural network to capture characteristics of received images even when the filter size of the neural network is small. Accordingly, the image preprocessing component 332 is configured to apply one or more preprocessing steps to received images to facilitate accurate image classification by a neural network. In this regard, the preprocessing component includes an image conversion/sizing sub-component 336, an image dividing sub-component 338, and a sub-image transposing sub-component 340. The image conversion/sizing sub-component 336 is configured to convert received images to grayscale images and to size the images to images having a desired aspect ratio (e.g., 2:1). In embodiments, the image conversion/sizing sub-component 336 is configured to convert received images to grayscale images having a particular aspect ratio (e.g., 2:1) and/or image resolution (e.g., 256 pixels×128 pixels). The image dividing sub-component 338 is configured to divide sized, grayscale images in half vertically and horizontally to generate a 2×2 grid comprised of four sub-images of equal size and shape that collectively comprise a grayscale image. An image 800 having four sub-image 810, 812, 814, 816 of equal size and shape is shown in the schematic diagram of FIG. 8A.

Figure 8B:
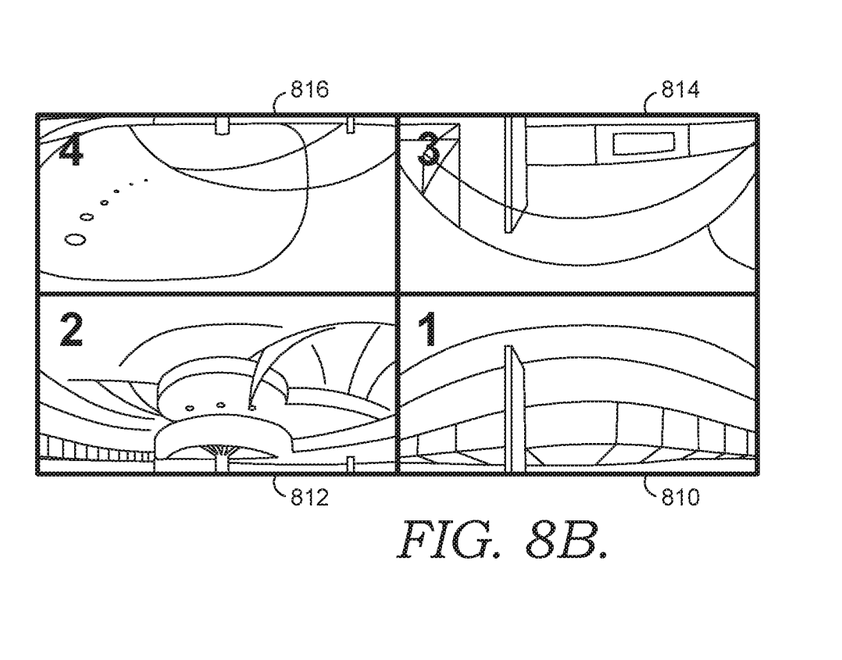
FIG. 8B is a schematic diagram illustrating the geometrically-transformed panoramic image of FIG. 8A having the sub-images transposed along each diagonal thereof, in accordance with implementations of the present disclosure.

The sub-image transposing sub-component 340 is configured for transposing the sub-images (810, 812, 814, 816 of FIG. 8A) such that the pixels comprising the top horizontal image boundary are positioned adjacent pixels comprising the bottom horizontal image boundary and pixels comprising the right vertical image boundary are positioned adjacent pixels comprising the left vertical image boundary. Such transposition of sub-images is illustrated in FIG. 8B.

Figure 9:
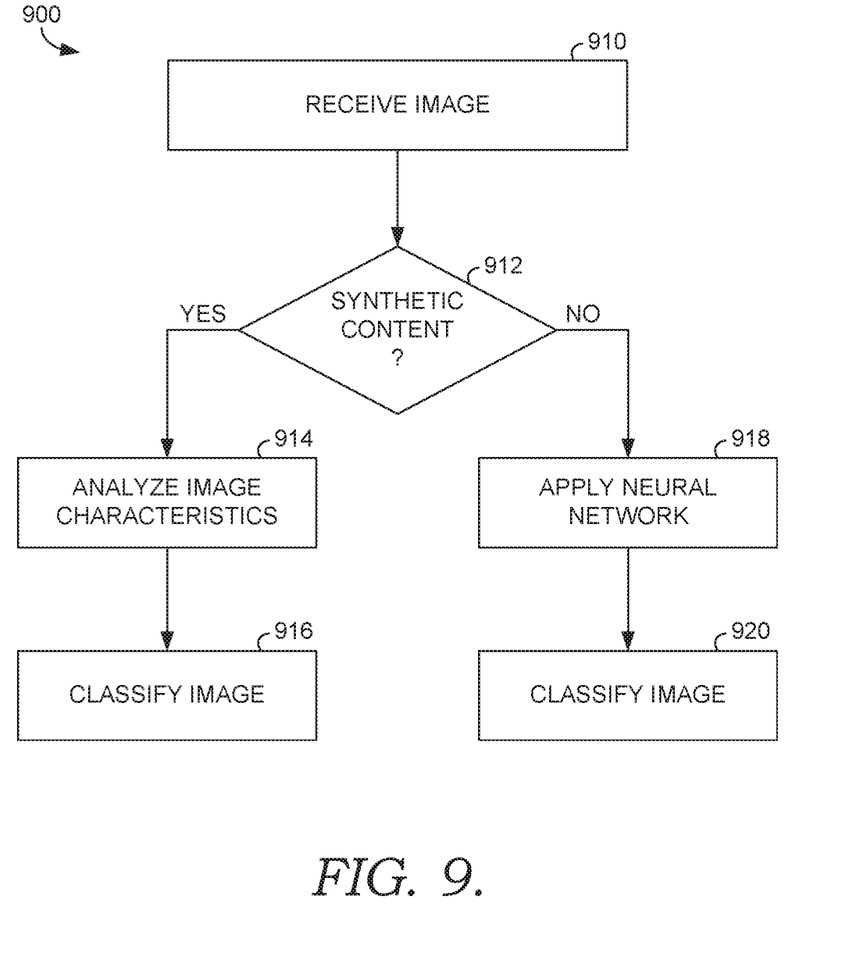
FIG. 9 is a flow chart illustrating a method for classifying images as synthetic panoramic images, synthetic non-panoramic images, non-synthetic panoramic images, or non-synthetic non-panoramic images, in accordance with implementations of the present disclosure.

Turning now to FIG. 9, illustrated is a schematic diagram showing an exemplary method 900 for classifying images, in accordance with embodiments of the present disclosure. As indicated at block 910, an image is received (e.g., by the image receiving component 318 of the classification engine 310 of FIG. 3). In embodiments, the received image is panoramic image to which a geometric transformation (for instance, an equi-rectangular projection) has been applied. As indicated at block 912, it is ascertained (e.g., by the camera/synthetic image content ascertaining component 324 of the classification engine 310 of FIG. 3) whether the image includes synthetic image content. If it is ascertained that the image includes synthetic image content, the method further includes analyzing the image characteristics (e.g., utilizing the characteristic analyzing component 322 of the classification engine 310 of FIG. 3) to determine if the image includes at least one image characteristic that is particular to panoramic images (for instance, equivalency of a threshold quantity of pixel values (e.g., 90%) among at least one of the top and bottom boundaries of the image, or a difference between the summed pixel values of the pixels comprising the right boundary of the image and the summed pixel values of the pixels comprising the left boundary of the image being less than or equal to a threshold value, e.g., 5.0). As indicated at block 916, based, at least in part, on the determination, the image is classified as a panoramic or non-panoramic image (for instance, utilizing the image classifying component 328 of the classification engine 310 of FIG. 3).

Returning to block 912, if it is ascertained (e.g., by the camera/synthetic image content ascertaining component 324 of the classification engine 310 of FIG. 3) that the image fails to include synthetic image content, the method further includes applying a trained neural network to the image, as indicated at block 918. Such neural network application may be done, for instance, by the neural network applying component 334 of the classification engine 310 of FIG. 3. As indicated at block 920, based, at least in part, on the application of the neural network, the image is classified as a panoramic image or a non-panoramic image (for instance, utilizing the classifying component 328 of the classification engine 310 of FIG. 3).

As such, embodiments of the present disclosure relate to a computer-implemented method for determining if images are panoramic or non-panoramic and classifying such images accordingly. The method includes receiving an image and ascertaining whether or not the image includes synthetic image content. Upon ascertaining that the image includes synthetic image content, the method further includes determining if the image includes at least one characteristic particular to panoramic images (e.g., that the pixel values among at least one of the top and bottom boundaries of the image have a threshold quantity of equivalency, or a difference between the summed pixel values of the pixels comprising the right boundary of the image and the summed pixel values of the pixels comprising the left boundary of the image is less than or equal to a threshold value). Upon determining that the image includes at least one characteristic particular to panoramic images, the method further includes classifying the image as a panoramic image. In aspects, the method further may include annotating the image as a panoramic image.

Embodiments of the present disclosure further relate to a computer system comprising one or more processors and one or more computer storage media storing computer-useable instructions that, when used by the one or more processors, cause the one or more processors to perform a method. The method includes receiving an image having a top horizontal boundary, a bottom horizontal boundary, a right vertical boundary and a left vertical boundary. Each of the top, bottom, right and left boundaries includes a respective plurality of pixels and each pixel has a pixel value. The method further includes determining that at least one of: (1) greater than or equal to a threshold quantity of the plurality of pixels comprising the top horizontal boundary or greater than or equal to the threshold quantity of the plurality of pixels comprising the bottom horizontal boundary have an equivalent pixel value, or (2) a difference between the summed pixel values of the pixels comprising the right boundary of the image and the summed pixel values of the pixels comprising the left boundary of the image is less than or equal to a threshold value. Still further, the method further includes classifying the image as a panoramic image based, at least in part, on the determination.

Still further, some embodiments of the present disclosure relate to a computer system comprising means for ascertaining whether an image includes synthetic image content, means for determining that the image includes at least one characteristic particular to panoramic images upon ascertaining that the image includes synthetic image content, and means for applying a neural network to the image upon ascertaining that the image includes fails to include synthetic image content.

Figure 10:
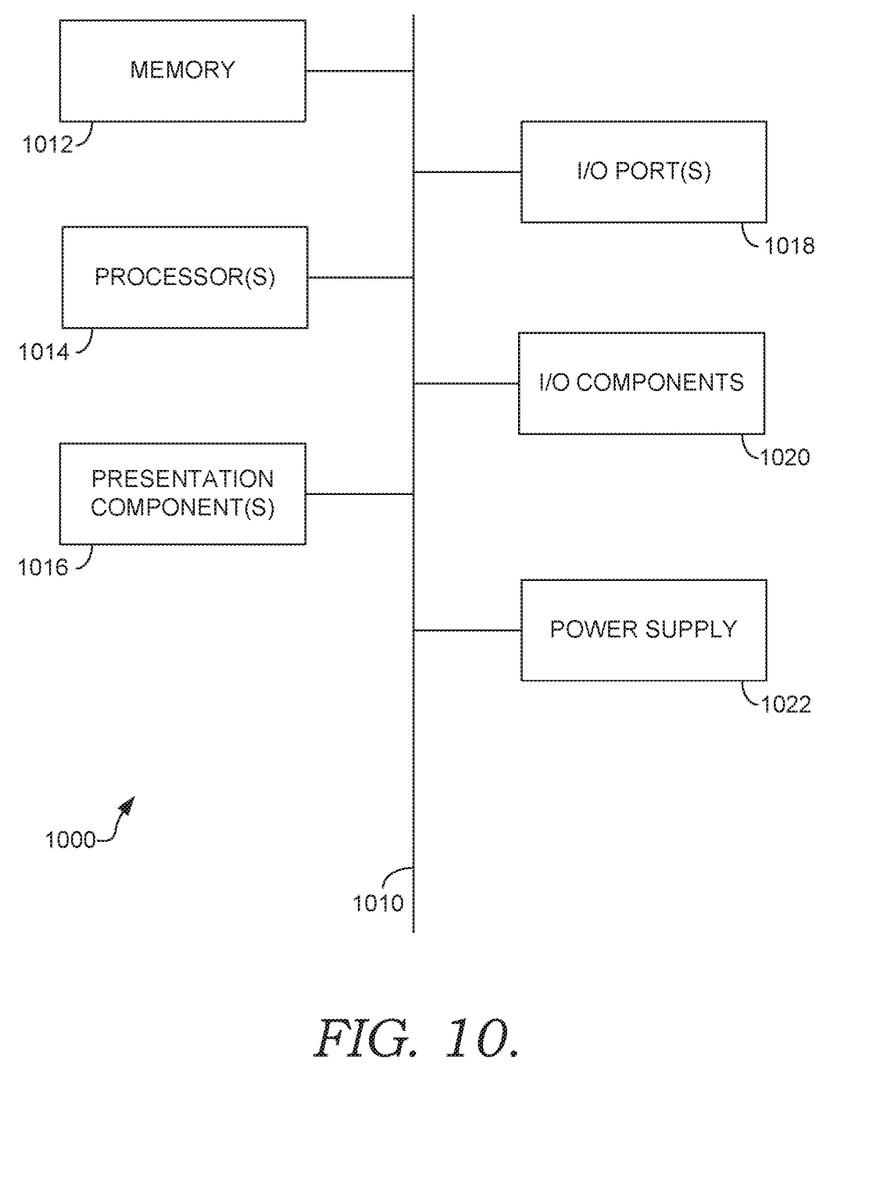
FIG. 10 is a block diagram of an exemplary computing environment suitable for use in implementations of the present disclosure.

Having described implementations of the present disclosure, an exemplary operating environment in which embodiments of the present disclosure may be implemented is described below in order to provide a general context for various aspects hereof. Referring to FIG. 10, an exemplary operating environment for implementing embodiments of the present disclosure is shown and designated generally as computing device 1000. The computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments hereof may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present disclosure may be practiced in a variety of system configurations, including hand-held devices, consumer electronics, general-purpose computers, more specialty computing devices, etc. Embodiments of the present disclosure also may be practiced in distributed computing environments where tasks are performed by remote-processing devices that are linked through a communications network.

With continued reference to FIG. 10, the computing device 1000 includes a bus 1010 that directly or indirectly couples the following devices: a memory 1012, one or more processors 1014, one or more presentation components 1016, input/output (I/O) ports 1018, input/output components 1020, and an illustrative power supply 1022. The bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

The computing device 1000 typically includes a variety of computer-readable media. Computer-readable media can be any available media that can be accessed by the computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1012 includes computer storage media in the form of volatile and/or nonvolatile memory. The memory may be removable, non-removable, or a combination thereof. Exemplary hardware devices include solid-state memory, hard drives, optical-disc drives, etc. The computing device 1000 includes one or more processors that read data from various entities such as the memory 1012 or the I/O components 1020. The presentation component(s) 1016 present data indications to a user or other device. Exemplary presentation components include a display device, speaker, printing component, vibrating component, etc.

The I/O ports 1018 allow the computing device 1000 to be logically coupled to other devices including the I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1000. The computing device 1000 may be equipped with depth cameras, such as, stereoscopic camera systems, infrared camera systems, RGB camera systems, and combinations of these for gesture detection and recognition. Additionally, the computing device 1000 may be equipped with accelerometers or gyroscopes that enable detection of motion.

As described above, implementations of the present disclosure relate to a framework for facilitating classification of images as panoramic images or non-panoramic images. The present disclosure has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computer-implemented method, comprising:
   receiving an image, wherein the image includes a collection of pixels, a top horizontal boundary, a bottom horizontal boundary, a right vertical boundary and a left vertical boundary, and wherein the top horizontal boundary, the bottom horizontal boundary, the right vertical boundary and the left vertical boundary are each comprised of a respective plurality of pixels;
   ascertaining whether the image includes synthetic image content;
   upon ascertaining that the image includes the synthetic image content, determining if the image includes at least one characteristic particular to panoramic images and classifying the image as a synthetic panoramic image or a synthetic non-panoramic image based, at least in part, on the determination, wherein determining if the image includes the at least one characteristic particular to panoramic images comprises determining that greater than or equal to a first threshold quantity of the plurality of pixels comprising the top horizontal boundary or greater than or equal to a second threshold quantity of the plurality of pixels comprising the bottom horizontal boundary have an equivalent pixel value; and
   upon ascertaining that the image fails to include the synthetic image content, applying a neural network to the image and classifying the image as a non-synthetic panoramic image or a non-synthetic non-panoramic image based, at least in part, on the application of the neural network.

2. The computer-implemented method of claim 1, wherein ascertaining whether the image includes the synthetic image content comprises determining whether pixel values of the collection of pixels have a high dynamic range.

3. The computer-implemented method of claim 1, wherein at least one of the first threshold quantity and the second threshold quantity is 90%.

4. The computer-implemented method of claim 1, wherein determining if the image includes the at least one characteristic particular to panoramic images comprises determining that a difference between summed pixel values of the plurality of pixels comprising the right vertical boundary of the image and summed pixel values of the plurality of pixels comprising the left vertical boundary of the image is less than or equal to a threshold value.

5. The computer-implemented method of claim 4, wherein the threshold value is at least 5.0.

6. The computer-implemented method of claim 1, further comprising annotating the image with a synthetic panoramic image classification, a synthetic non-panoramic image classification, a non-synthetic panoramic image classification, or a non-synthetic non-panoramic image classification.

7. The computer-implemented method of claim 1,
   wherein upon ascertaining that the image fails to include the synthetic image content, the method further comprises, prior to applying the neural network, converting the image to a grayscale image having an aspect ratio of less than or equal to 2:1,
   wherein the grayscale image includes a second collection of pixels, a second top horizontal boundary, a second bottom horizontal boundary, a second right vertical boundary and a second left vertical boundary, and
   wherein the second top horizontal boundary, the second bottom horizontal boundary, the second right vertical boundary and the second left vertical boundary are each comprised of a respective plurality of pixels, each pixel of each plurality having a specific pixel value.

8. The computer-implemented method of claim 7, further comprising:
   dividing the grayscale image in half vertically and horizontally to generate a 2×2 grid comprised of four sub-images of equivalent size and shape that collectively comprise the grayscale image; and
   transposing sub-images in each diagonal direction of the 2×2 grid such that pixels comprising the second top horizontal boundary are positioned adjacent pixels comprising the second bottom horizontal boundary and pixels comprising the second right vertical boundary are positioned adjacent pixels comprising the second left vertical boundary.

9. The computer-implemented method of claim 1, further comprising training the neural network with a plurality of images classified as non-synthetic panoramic images or non-synthetic non-panoramic images prior to applying the neural network to the image.

10. A computing system comprising:
one or more processors; and
one or more computer storage media storing computer-useable instructions that, when used by the one or more processors, cause the one or more processors to:
receive an image having a top horizontal boundary, a bottom horizontal boundary, a right vertical boundary and a left vertical boundary, wherein the top horizontal boundary, the bottom horizontal boundary, the right vertical boundary and the left vertical boundary are each comprised of a respective plurality of pixels, each pixel having a pixel value;
determine that the image includes at least one characteristic that is particular to panoramic images based on a difference between summed pixel values of the plurality of pixels comprising the right vertical boundary of the image and summed pixel values of the plurality of pixels comprising the left vertical boundary of the image being less than or equal to a threshold value; and
classify the image as a panoramic image based, at least in part, on the determination.

11. The computing system of claim 10,
wherein the received image includes a collection of pixels,
wherein each pixel of the collection of pixels has a pixel value, and
wherein the computer-useable instructions, when used by the one or more processors, further cause the one or more processors to ascertain that the image includes synthetic image content by determining the pixel values of the collection of pixels include a high dynamic range.

12. The computing system of claim 10, wherein the computer-useable instructions, when used by the one or more processors, cause the one or more processors to determine that the image includes at least one characteristic that is particular to panoramic images by determining that greater than or equal to a threshold quantity of the plurality of pixels comprising the top horizontal boundary or greater than or equal to a threshold quantity of the plurality of pixels comprising the bottom horizontal boundary have an equivalent pixel value.

13. The computing system of claim 10, wherein the computer-useable instructions, when used by the one or more processors, further cause the one or more processors to annotate the image with a panoramic image classification.

14. A computing system comprising:
means for ascertaining whether an image includes synthetic image content;
means for determining that the image includes at least one characteristic particular to panoramic images upon ascertaining that the image includes the synthetic image content, wherein the means for determining comprises means for determining that (1) greater than or equal to a first threshold quantity of a plurality of pixels comprising a top horizontal boundary of the image or greater than or equal to a second threshold quantity of a plurality of pixels comprising a bottom horizontal boundary of the image have an equivalent pixel value, or (2) a difference between summed pixel values of a plurality of pixels comprising a right vertical boundary of the image and summed pixel values of a plurality of pixels comprising a left vertical boundary of the image is less than or equal to a threshold value; and
means for applying a neural network to the image upon ascertaining that the image fails to include the synthetic image content.

15. The computing system of claim 14, wherein the means for ascertaining whether the image includes the synthetic image content comprises means for determining if the image includes a high dynamic range of pixel values.

16. The computing system of claim 14, further comprising means for classifying the image as a synthetic panoramic image, a synthetic non-panoramic image, a non-synthetic panoramic image, or a non-synthetic non-panoramic image.

* * * * *